US 8,681,759 B2

(12) United States Patent
Kholaif et al.

(10) Patent No.: US 8,681,759 B2
(45) Date of Patent: Mar. 25, 2014

(54) METHODS AND APPARATUS FOR USE IN EFFICIENTLY SCANNING FOR WIRELESS NETWORKS BASED ON APPLICATION TYPE

(75) Inventors: Ahmad Mohammad Mohammand Kholaif, Waterloo (CA); Rudy Eugene Rawlins, Waterloo (CA)

(73) Assignee: BlackBerry Limited, Waterloo (CA)

( * ) Notice: Subject to any disclaimer, the term of this patent is extended or adjusted under 35 U.S.C. 154(b) by 179 days.

(21) Appl. No.: 13/087,824

(22) Filed: Apr. 15, 2011

(65) Prior Publication Data
US 2012/0263155 A1    Oct. 18, 2012

(51) Int. Cl.
*H04W 4/00*    (2009.01)

(52) U.S. Cl.
USPC ............................. 370/338; 370/400; 370/465

(58) Field of Classification Search
USPC ......... 370/328–329, 338, 352–356, 400–401, 370/465–466
See application file for complete search history.

(56) References Cited

U.S. PATENT DOCUMENTS

| | | | |
|---|---|---|---|
| 6,556,825 B1 | 4/2003 | Mansfield | |
| 6,965,675 B1* | 11/2005 | Trimberger et al. | 380/277 |
| 7,184,768 B2 | 2/2007 | Hind et al. | |
| 7,200,112 B2* | 4/2007 | Sundar et al. | 370/230 |
| 7,212,827 B1 | 5/2007 | Veschl | |
| 7,221,904 B1 | 5/2007 | Gavrilovich | |
| 7,505,446 B2 | 3/2009 | Pecen | |
| 7,924,785 B2* | 4/2011 | Shaheen et al. | 370/331 |
| 7,957,357 B2* | 6/2011 | Tysowski et al. | 370/338 |
| 8,045,980 B2* | 10/2011 | Buckley et al. | 455/434 |
| 8,055,256 B2 | 11/2011 | Rudowicz et al. | |
| 8,090,395 B2 | 1/2012 | Ngai et al. | |
| 8,254,985 B2* | 8/2012 | Ekicl et al. | 455/550.1 |
| 2003/0142641 A1* | 7/2003 | Sumner et al. | 370/328 |
| 2003/0228842 A1 | 12/2003 | Heinonen et al. | |
| 2004/0137905 A1 | 7/2004 | Jeong et al. | |
| 2004/0142693 A1 | 7/2004 | Feder et al. | |
| 2004/0264427 A1 | 12/2004 | Jaakkola et al. | |

(Continued)

FOREIGN PATENT DOCUMENTS

EP    1937007 A1    6/2008
WO    0147316 A2    6/2001

(Continued)

OTHER PUBLICATIONS

European Search Report for EP patent application # 11162666.9, Sep. 21, 2011.

(Continued)

*Primary Examiner* — Kevin Mew
(74) *Attorney, Agent, or Firm* — Perry + Currier Inc.

(57) ABSTRACT

A mobile communication device invokes a first application or a second application. When the first application is invoked, the mobile device scans to search for one or more WLANs identified in a first subset of WLAN profiles. When the second application is invoked, the mobile device scans to search for one or more WLANs identified in a second subset of WLAN profiles. The first application may be a messaging application, such as a personal information manager (PIM) application, which may utilize WLANs having external network connectivity. The second application may be a streaming media application, which may utilize WLAN appliances having no external network connectivity. Alternatively, the second application may be a conference meeting application or military application which may utilize ad hoc networks having no external network connectivity.

32 Claims, 7 Drawing Sheets

(56) References Cited

U.S. PATENT DOCUMENTS

| | | |
|---|---|---|
| 2005/0059397 A1 | 3/2005 | Zhao |
| 2005/0090277 A1 | 4/2005 | Islam et al. |
| 2005/0097356 A1 | 5/2005 | Zilliacus et al. |
| 2005/0148299 A1* | 7/2005 | Buckley ................ 455/41.2 |
| 2005/0232209 A1* | 10/2005 | Buckley et al. ............ 370/338 |
| 2005/0259619 A1 | 11/2005 | Boettle et al. |
| 2006/0217147 A1* | 9/2006 | Olvera-Hernandez et al. ................ 455/552.1 |
| 2006/0256008 A1 | 11/2006 | Rosenberg |
| 2007/0037574 A1 | 2/2007 | Libov et al. |
| 2007/0064650 A1* | 3/2007 | Lohtia et al. ............ 370/331 |
| 2007/0237121 A1 | 10/2007 | Khandelwal et al. |
| 2007/0273583 A1 | 11/2007 | Rosenberg |
| 2007/0275701 A1 | 11/2007 | Jonker |
| 2008/0096580 A1 | 4/2008 | Montemurro |
| 2008/0176579 A1 | 7/2008 | Abdel-Kader |
| 2008/0182563 A1 | 7/2008 | Wugofski et al. |
| 2008/0248801 A1 | 10/2008 | Fletcher et al. |
| 2009/0011773 A1* | 1/2009 | Balachandran et al. ... 455/456.1 |
| 2009/0022076 A1 | 1/2009 | Canpolat et al. |
| 2009/0082038 A1 | 3/2009 | McKiou et al. |
| 2009/0175207 A1* | 7/2009 | Stephenson et al. ......... 370/311 |
| 2009/0201896 A1 | 8/2009 | Davis et al. |
| 2009/0232040 A1 | 9/2009 | Abdel-Kader |
| 2009/0279489 A1 | 11/2009 | Deu-Ngoc et al. |
| 2009/0279492 A1 | 11/2009 | Montemurro et al. |
| 2011/0014897 A1 | 1/2011 | Finucan |
| 2011/0149789 A1* | 6/2011 | Edge ............................ 370/252 |
| 2011/0149806 A1 | 6/2011 | Verma et al. |
| 2011/0299422 A1* | 12/2011 | Kim et al. .................. 370/253 |
| 2011/0310875 A1* | 12/2011 | Tysowski et al. ............ 370/338 |
| 2012/0076117 A1* | 3/2012 | Montemurro et al. ........ 370/338 |
| 2012/0076118 A1* | 3/2012 | Montemurro et al. ........ 370/338 |
| 2012/0257536 A1* | 10/2012 | Kholaif et al. ................ 370/254 |

FOREIGN PATENT DOCUMENTS

| | | |
|---|---|---|
| WO | 2005112358 A1 | 11/2005 |
| WO | 2007099414 A1 | 9/2007 |
| WO | 2010096063 A1 | 8/2010 |
| WO | 2012006446 A1 | 1/2012 |

OTHER PUBLICATIONS

Jooris et al., "Mobile Communication & Service Continuity in a Train Scenario", 12th Annual Symposium of the IEEE/CVT, Oct. 15, 2005, pp. 1-7, Enschede, The Netherlands.

"Digital Living Network Alliance", pp. 1-6, Jan. 13, 2011, http://en.wikipedia.org/wiki/digital living network alliance.

Bluetooth SIG Imaging Working Group:, "Basic Imaging Profile. Interoperability Specification", Bluetooth Documentation, Jul. 25, 2003, XP007900617, pp. 1-100, http://www.bluetooth.com/NR/rdonlyres/182ccd92-3481-44F0-B901-9181BE573AFA/924/BIP_SPEC_V10.pdf.

* cited by examiner

METHODS AND APPARATUS FOR USE IN EFFICIENTLY SCANNING FOR WIRELESS NETWORKS BASED ON APPLICATION TYPE

BACKGROUND

1. Field of the Technology

The present disclosure relates generally to mobile communication devices which communicate in wireless communication networks, such as wireless local area networks (WLANs), and more particularly to scanning to search for and connect with such wireless networks.

2. Description of the Related Art

A mobile communication device, such as a portable battery-powered wireless communication device, is operative to communicate in wireless communication networks. For example, the mobile device may communicate through wireless access points (APs) of wireless local area networks (WLANs) which operate in accordance with IEEE 802.11 standards or the like.

When the mobile device is powered-on, or radio frequency (RF) coverage is regained after a coverage loss, the mobile device performs a scanning operation with use of its wireless transceiver to identify one or more available wireless networks in its surrounding area. During each scanning operation, the mobile device may transmit a probe request to each wireless network identified in one or more network profiles stored in the mobile device, and wait for a probe response from the network in return. Each time the scanning operation fails to result in any connection between the mobile device and a wireless network, the scanning operation is repeated by the mobile device after delaying for a delay period. This process continually repeats until the mobile device connects with one of the wireless networks.

There is a need for more efficient scanning procedures with reduced power consumption in these and similar environments.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Techniques for efficient scanning for WLANs based on application type are described. A mobile device invokes a first application or a second application. When the first application is invoked, the mobile device scans to search for one or more wireless networks identified in a first subset of wireless network profiles stored in the mobile device. When the second application is invoked, the mobile device scans to search for one or more wireless networks identified in a second subset of wireless network profiles stored in the mobile device. Advantageously, a suitable WLAN may be more efficiently identified with use of a technique which reduces power consumption of the mobile device.

Figure 1:
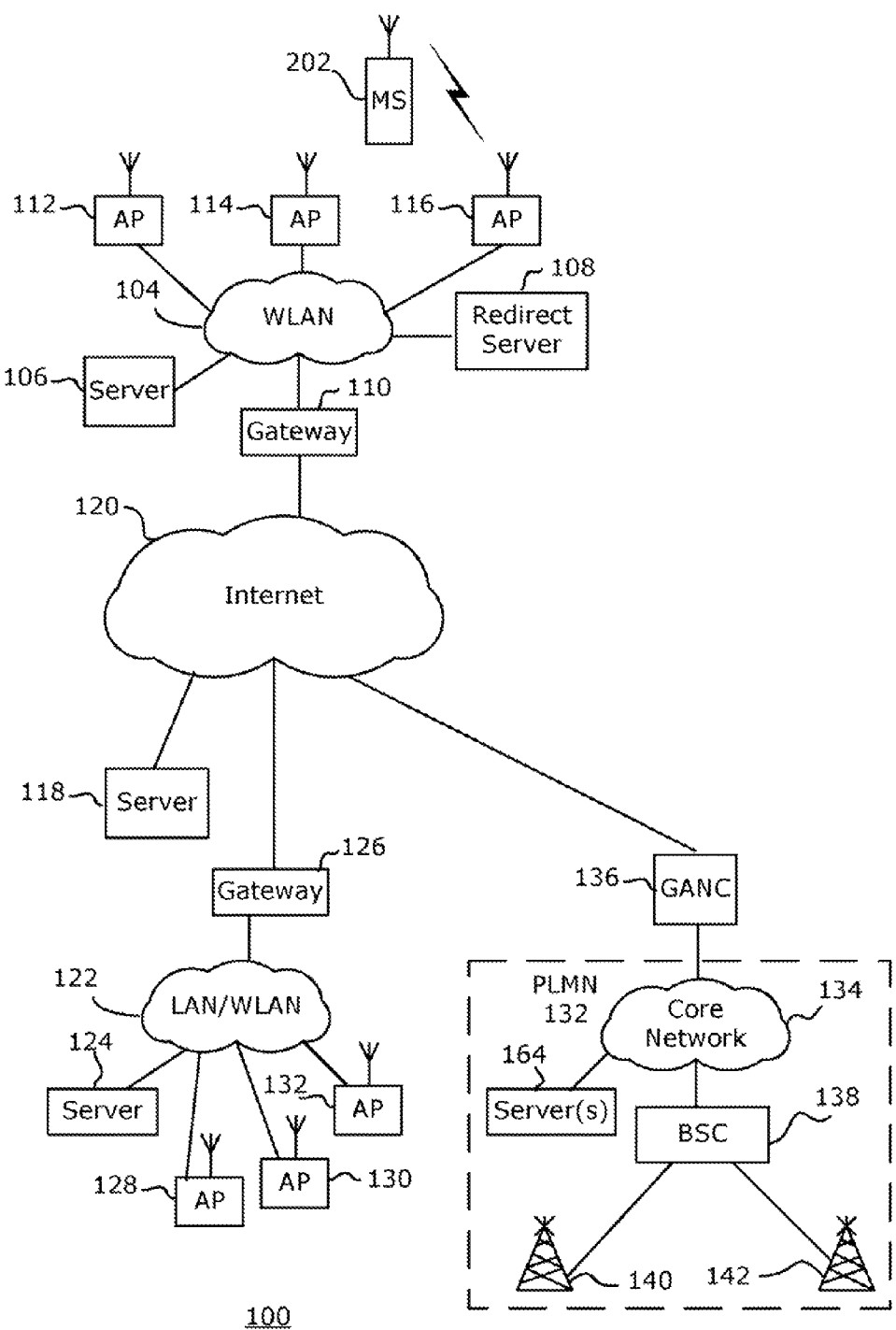
FIG. 1 is an illustrative representation of a communication system which includes wireless communication networks within which a mobile communication device may operate.

To illustrate one exemplary network architecture within which the techniques of the present disclosure may be practiced, FIG. 1 is a communication system 100 which includes a wireless local area network (WLAN) 104 within which a mobile communication device 202 may operate. WLAN 104 has a plurality of wireless access points (APs) 112, 114, and 116 for wireless communications with mobile device 202. In the present embodiment, WLAN 104 and mobile device 202 operate in accordance with IEEE 802.11 standards. Such WLANs are identifiable by a mobile device 202 from a Set Service Identifier (SSID) or Extended SSID (ESSID). WLAN 104 also includes one or more servers 106, a redirect server 108, and a gateway 110. Server 106 may provide data, applications, and/or functionality for communication services in WLAN 104.

Mobile device 202 may also operate for communications in different LANs/WLANs, such as WLAN 122. Similar to WLAN 104, WLAN 122 has a plurality of wireless APs 128, 130 and 132, one or more servers 124, and a gateway 126. In this embodiment, WLAN 122 is a private communication network of an enterprise (small company, corporation, etc.) associated with mobile device 202. Such WLANs 104 and 122 may provide or allow access to various data and communication services to its terminals. For example, the WLANs may provide for access to Internet 120 via the Web browser application, or voice telephony communication services with use of Voice over IP (VoIP) communications or other techniques.

For "push-type" data or message synchronization services, mobile device 202 is enabled to maintain data synchronization with a server (e.g. server 106 or 118) for user data of an application associated with a user account. The application of mobile device 202 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. These and other applications of mobile device 202 are also identified later in relation to FIG. 5. For the data-synchronized communications, the server maintains storage of a mapping of a user account name or identifier of the user account with a personal identification number of mobile device 202. When communications are required with mobile device 202, the personal identification number is used to route the messages to/from mobile device 202 through communication system 100.

In contrast to WLAN 122, WLAN 104 may be a public WiFi "hotspot" for public use and include what is referred to as a "captive portal" or "walled garden." For devices connected in WLAN 104 via one of wireless APs 112, 114, and 116, gateway 110 is configured to permit or deny access to the data, applications, and/or functionality, as well as to permit or deny external access outside of WLAN 104 to Internet 120.

To do this, gateway 110 has a set of IP address filters which define a set of addresses that are permissible/impermissible, if any at all, for access by devices. Access by a device depends on whether or not a device has been authorized and what access rights are given upon-authorization.

Typically, when a request by a device in WLAN 104 is made prior to proper authorization, gateway 110 is configured to redirect the request to redirect server 108. In response, redirect server 108 is configured to respond to mobile device 202 to provide data for producing information (e.g. a Web page information) which is rendered in a visual display of mobile device 202 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 108 may be referred to by a different name depending on any more specific purpose (e.g. authentication server, registration server, user confirmation server, etc.).

The user will enter a user response via the Web browser application, for example, which is sent by mobile device 202 and received by gateway 110. Gateway 110 identifies whether the received user response is sufficient (e.g. whether the user name and password match prestored user name and password information, whether the user payment is accepted, whether the user acceptance is confirmed, etc.). If the user response is deemed sufficient, gateway 110 permits access to the data, applications, and/or functionality in or outside of WLAN 104.

Again, in contrast to WLAN 104, WLAN 122 may be a private communication network of an enterprise associated with mobile device 202. For devices attempting to access WLAN 122 via Internet 120, gateway 126 is configured to permit or deny internal access to the data, applications, and/or functionality in WLAN 122. For devices connected in WLAN 122 via one of wireless APs 128, 130, and 132, gateway 126, may be configured to permit or deny access to the data, applications, and/or functionality offered via WLAN 122 depending on whether or not a device has been authorized and what access rights are given upon authorization.

Communication may also be configured in accordance with Generic Access Network (GAN) technologies. Using GAN based technologies, mobile device 202 may also access communication services from a core network 134 of a Public Land Mobile Network (PLMN) 132 (e.g. cellular). GAN technology may provide, amongst other things, a voice communication service for mobile device 202 via the WLAN hotspot. PLMN 132 includes a core network 136, a plurality of base station controllers such as a base station controller (BSC) 138 coupled to core network 136, and a plurality of base stations such as a base station (BS) 140 and a base station 142 coupled to associated BSCs 138. Core network 136, BSC 138, and BS 140 operate in a conventional fashion as well-documented. Other PLMNs in the environment have a similar or the same architecture as PLMN 132. Such environments may be referred to as cellular telecommunications networks.

Communications between WLAN 104 and core network 134 of PLMN 132 may be facilitated through a suitable connecting network such as a broadband, wide-area IP communication network (e.g. the Internet 120) or any suitable public or private wide area network. Gateway/controller or GAN controller (GANC) 136 is provided between the Internet 120 and core network 134 of PLMN 132 in order to facilitate access to core network 134 by terminals through alternative links (e.g. radio links wireless APs 112, 114, and 116) different than those conventional radio links offered in the PLMN 132 (e.g. radio links of base stations 140 and 142). Thus, mobile device 202 may also access services of core network 134 of PLMN 132 via WLANs, such as WLAN 104, through use of a WLAN radio interface as opposed to a cellular telephony interface. For such communications, GANC 136 and mobile device 202 are adapted to establish and maintain a (secure) tunnel connection between each other through the intervening networks. Note that WLAN 104 may be operator-controlled or provided (e.g. controlled or provided by the operator associated with PLMN 132), user-controlled or provided (e.g. controlled or provided by the end user of mobile device 202), or third-party-controlled or provided.

Again, GANC 136 operates in accordance with GAN based technology (formerly known as Unlicensed Mobile Access (UMA), and may be or include GANC 136 (formerly known as UMA Network Controller or UNC) or the like. In this case, terminals including mobile device 202 are enabled with GAN technology for operating in a GAN mode of operation. GAN methodologies are known and described in publicly available documentation. Mobile device 202 with GAN-enabled, dual-mode operation may be within operating range of WLAN 104 for communications. Upon connecting, mobile device 202 contacts GANC 136, via WLAN 104 and the Internet 120, to be authenticated and authorized to access voice and data communication services of core network of PLMN 132. If approved, the subscriber's current location information is stored in core network 134 of PLMN 132 and, from that point on, all voice and data traffic for mobile device 202 is routed to the device via WLAN 104, in contrast to a radio access network (RAN) of PLMN 132 which includes BSC 138 and BSs 140 and 142. In this state, mobile device 202 is operating in a GAN mode of operation. When a call is established for mobile device 202 while operating within WLAN 104, the call connection for the call is routed within core network 134 but RF resources of WLAN 104 are utilized.

Today, mobile device 202 may be further configured to enter into an access point (AP) mode of operation, so that other communication devices may associate with them for direct RF communications therebetween. This AP mode of operation, which may be referred to as a "mobile AP mode" or the like, provides a benefit due to the high data rates available over WLAN links. Here, again, the data may be communicated directly between the mobile devices without the data traversing any wireless network infrastructure, where one of the mobile devices is set to operate or serve as an access point (AP) (switching operation from as an end terminal) and the other communication device operates as an end terminal to associate and connect with the AP (i.e. the mobile device 202 operating as an AP) for communications. It is possible that when mobile device 202 operates in the AP mode, it may also operate as a client with another AP.

Figure 2:
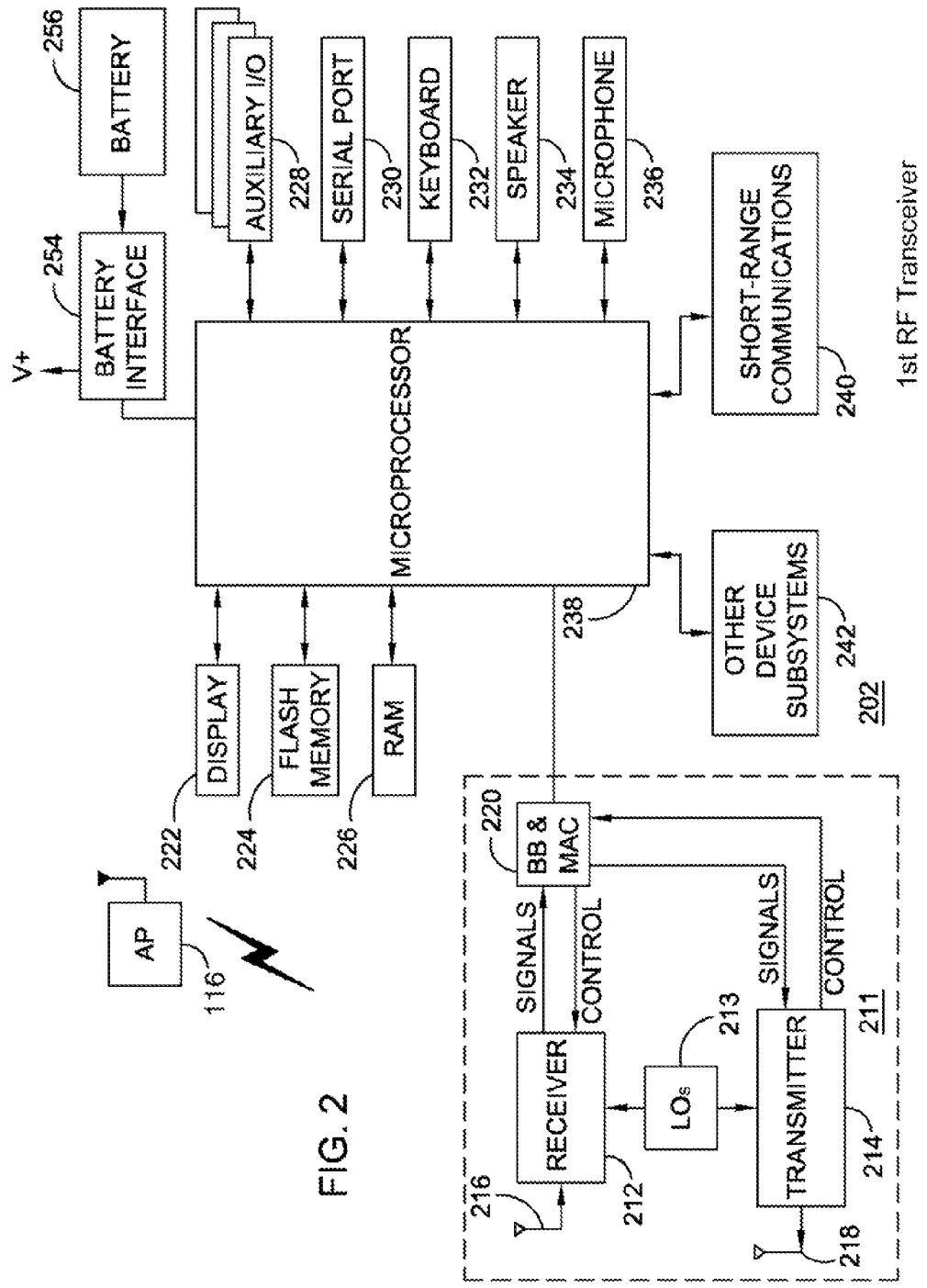
FIG. 2 is a schematic block diagram of the mobile communication device of FIG. 1.

Referring now to FIG. 2, electrical components of a typical mobile communication device 202 (e.g. a mobile station, mobile terminal, or user equipment "UE", or the like) which operates with wireless APs of communication system 100 of FIG. 1 will be described. Mobile device 202 may be representative of one or more terminals shown and described in relation to FIG. 1. Mobile device 202 may be a two-way communication device having at least voice and/or advanced data communication capabilities, including the capability to communicate with other computer systems. Also, mobile device 202 may be a wireless communication device which operates in accordance with an IEEE 802.11 standards. Depending on the multiple functionality provided by mobile device 202, it may be referred to as one of more of the following: a data messaging device, a two-way pager, a cellular-type telephone with data messaging capabilities, a wireless Internet appliance, or a data communication device (with or without telephony capabilities).

As shown in FIG. 2, mobile device 202 is adapted to wirelessly communicate with wireless APs of WLANs, such as AP 116 of MAN 104 of FIG. 1. For communication with AP 116, mobile device 202 utilizes a communication subsystem 211. Depending on the type of device, mobile device 202 may also be configured to wirelessly communicate with other systems such as cellular telecommunication systems. With such configuration, mobile device 202 may be referred to as a "dual mode" mobile device. Although mobile device 202 may have separate and independent subsystems for these purposes, at least some portions or components of these otherwise different subsystems may be shared where possible.

Communication subsystem 211 includes a receiver 212, a transmitter 214, and associated components, such as one or more (e.g. embedded or internal) antenna elements 216 and 218, local oscillators (LOs) 213, and a processing module such as a baseband (BB) and media access control (MAC) processing module 220. Communication subsystem may be or referred to as a radio frequency (RF) transceiver or wireless transceiver. As will be apparent to those skilled in the field of communications, the particular design of communication subsystem 211 depends on the communication network in which mobile device 202 is intended to operate. In the present disclosure, communication subsystem 211 (including its associated processor/processing components) are operative in accordance with IEEE 802.11 standards.

Mobile device 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile device 202 may be a handheld portable battery-powered device, it also includes a battery interface 254 for receiving one or more rechargeable batteries 256. Such a battery 256 provides electrical power to most if not all electrical circuitry in mobile device 202, and battery interface 254 provides for a mechanical and electrical connection for it. Battery interface 254 is coupled to a regulator (not shown in FIG. 2) that provides a regulated voltage V to all of the circuitry.

Mobile device 202 includes a microprocessor 238 (one type of processor or controller) that controls overall operation of mobile device 202. This control includes the techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Keyboard 232 may be a complete alphanumeric keyboard and/or telephone-type keypad. On the other hand, keyboard 232 and display 222 may be replaced or enhanced with a touch screen display or other suitable input mechanism, or replaced or enhanced with a voice-activated input module.

Operating system software used by microprocessor 238 may be stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226. Microprocessor 238, in addition to its operating system functions, enables execution of software applications on mobile device 202. A predetermined set of applications that control basic device operations, including data and/or voice communication applications, will normally be installed on mobile device 202 during its manufacture. This includes applications or modules which are configured to perform the network selection techniques of the present disclosure. For this reason, microprocessor 238 (and any other processor(s) or modules of mobile device 202) may enable execution of particular applications or modules for performing enhanced network selection techniques for access to multiple aggregator services.

Another application that may be loaded onto mobile device 202 may be a messaging application, such as a personal information manager (PIM) application, which has the ability to organize and manage data items. The data items may relate to user data items such as, but not limited to, e-mail, calendar events, voice mails, appointments, and task items. The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile device 202 with respect to such items. This is especially advantageous where the host computer system is the wireless device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile device 202 may also compose data items, for example, using keyboard 232 in conjunction with display 222 and possibly auxiliary I/O device 228. The composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional component that provides for communication between mobile device 202 and different systems or devices, which need not necessarily be similar devices. In this embodiment, communication subsystem 240 is a BLUETOOTH® communication module to provide for communication with similarly enabled systems and devices. Note that the BLUETOOTH® standards may be defined by or based on BLUETOOTH® Specification Version 2.0, Volumes 1 and 2, for example.

Figure 4:
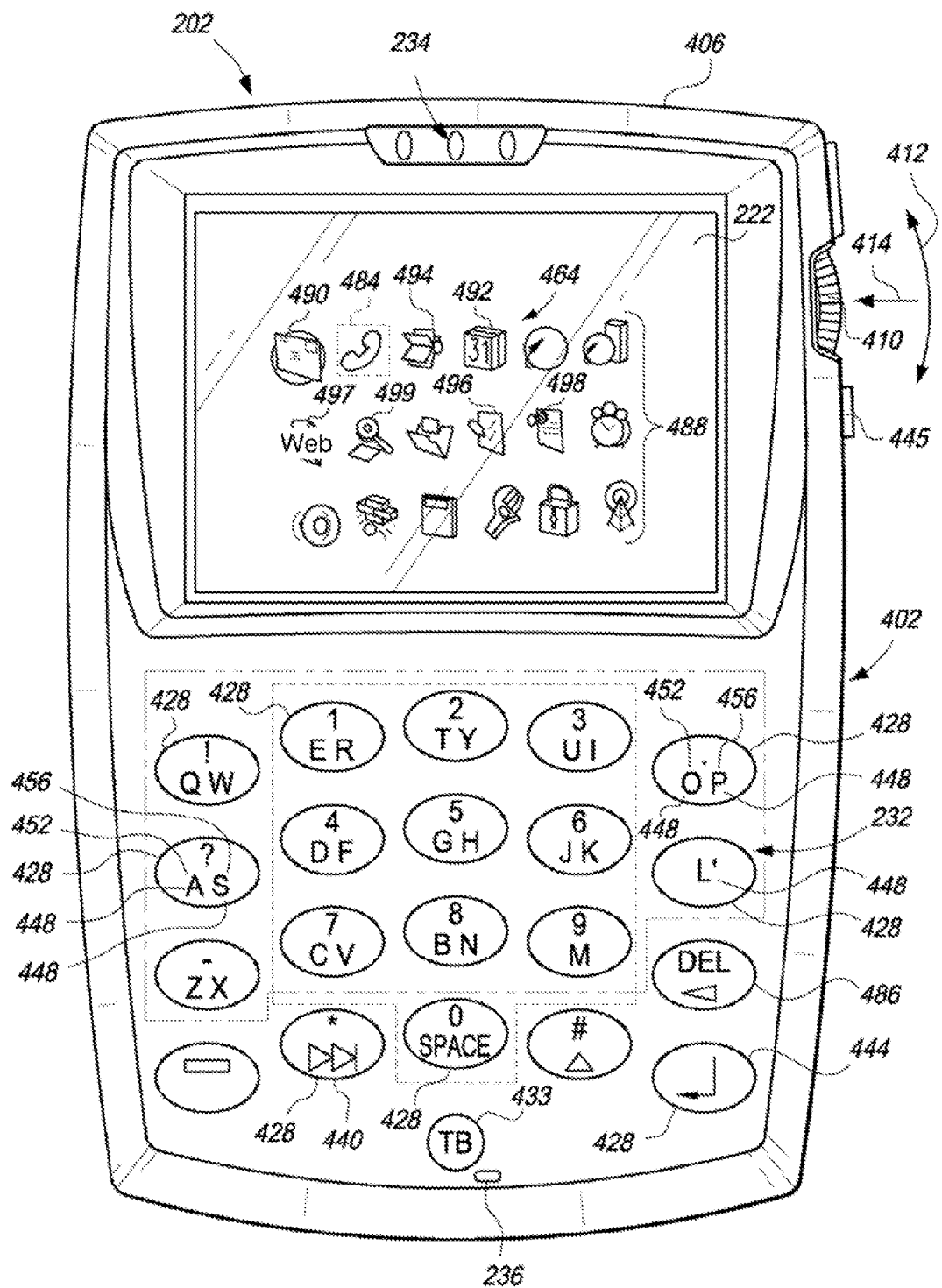
FIG. 4 is an illustrative example of an exemplary user interface of the mobile communication device.

Referring ahead to FIG. 4, an illustrative representation of an exemplary user interface 402 of mobile device 202 is shown. Mobile device 202 includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile communication device 202 is sized to be a handheld portable device. As an alternative to or in addition to positioning wheel 410 and/or trackball 433, a wide range of one or more pointing or cursor/view positioning mechanisms such as a touch pad, a track pad, a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor. Display 222 may include a cursor 484 that depicts generally where the next input or selection from user interface 402 will be received.

Display 222 is shown in FIG. 4 as displaying a home screen that represents a number of applications 586 depicted as corresponding discrete icons 488. Icons 488 include, for example, an Electronic Mail (E-Mail) icon 490, a Calendar icon 492, an Address Book icon 494, a Meeting icon 496, a Messages icon 497, a Streaming Media icon 498, and a Search icon 499, respectively.

Figure 5:
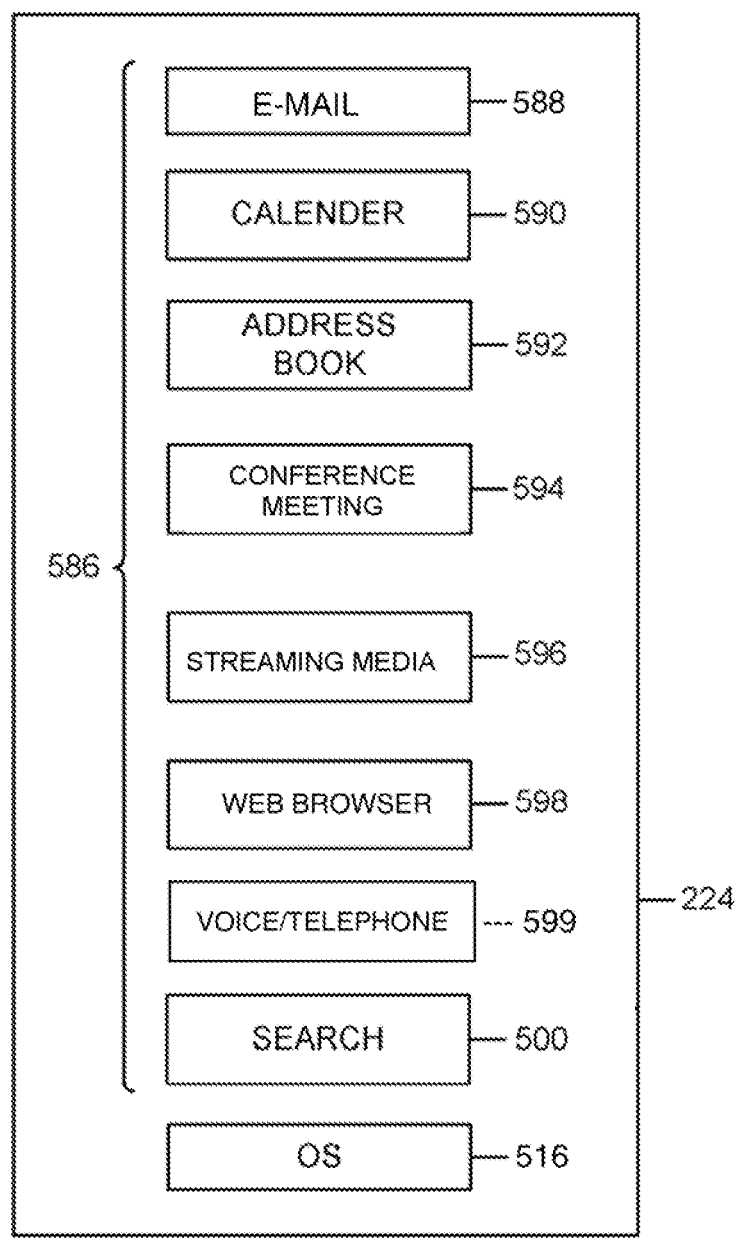
FIG. 5 is an illustrative representation of memory of the mobile communication device which includes a plurality of applications.

As shown now further in FIG. 5, memory 224 of the mobile device includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Conference Meeting application 594 (FIG. 5) associated with Meeting icon 496 (FIG. 4), a Streaming Media application 596 (FIG. 5) associated with Streaming Media icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). The PIM application of the mobile device may include one or more of the E-mail application 588, Calendar application 590, and the Address Book application 592. An operating system (OS) program 516 also resides in memory 224.

The "home" screen output is shown in FIG. 4 as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the inventive methods and apparatus which will be described in fuller detail below. Note that many components of mobile device 202 shown and described may not be included (e.g. a full QWERTY keypad may be optional). Again, keyboard 232 and display 222 may be substituted or enhanced with a touch screen display or other suitable input mechanism, or enhanced or replaced with a voice-activated input module. Also, although the description of the architecture relates to a specific example for illustration, where the WLAN is an IEEE 802.11-based network, different environments may be applicable as well. The wireless network may be a WiMAX-based network (i.e. IEEE 802.16), or an Ultra-WideBand (UWB)-based network (i.e. IEEE 802.15), as a few examples.

Referring back to FIG. 3, an illustrative representation of a part of the communication system 100 of FIG. 1 which includes WLANs of different types is shown. For one, WLAN 104 and WLAN 122 are wireless networks of the traditional type, which provide for external network connectivity, as described earlier in relation to FIG. 1. For example, WLANs 104 and 122 are configured to provide or facilitate access to the Internet 120 (or other communication network, such as a public communication network) for mobile device 202 when connected therewith. Note that WLANs 104 and 122 providing for external network connectivity may be further differentiated or identified as providing external network connectivity that is either "paid" (or for pay) or "free" (or e.g. high cost versus low cost) for the mobile device.

Figure 3:
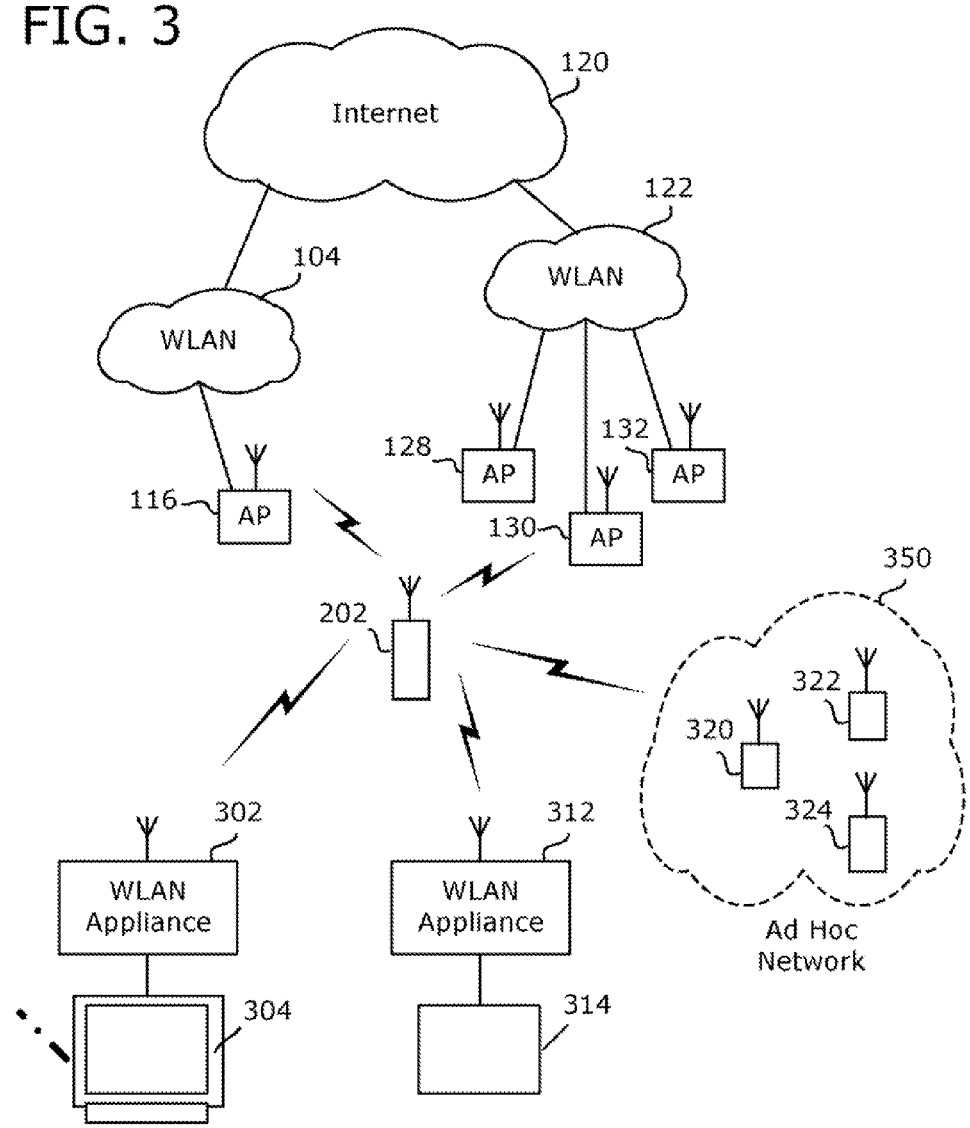
FIG. 3 is an illustration representation of a part of the communication system of FIG. 1, which includes different types of WLANs, including WLANs having external network connectivity, WLAN appliances (e.g. a streaming media player), and ad hoc networks, as some examples.

Other WLANs shown in FIG. 3 may be appliances, such as WLAN appliance 302. WLAN appliance 302 may be configured to connect with an electrical appliance 304. Typically, such WLAN appliances have no external connectivity, and may be referred to as "local-only" networks. As one example, WLAN appliance 302 may be a streaming media, player, where electrical appliance 304 is a television (e.g. audio and/or video is streamed from mobile device 202 to the television, or vice versa).

Another type of WLAN having no external connectivity (i.e. a "local-only" network) may be one that provides or facilitates a local service, such as WLAN 312. WLAN 312 may include a local server 314 configured to provide or facilitate the local service. For example, WLAN 312 which includes local server 314 may be configured to provide and facilitate a (e.g. local) commercial transaction (e.g. an e-commerce transaction) through use of an application such as a Web browser application of the mobile device. Here, local server 314 may be configured to facilitate the presenting, order receiving, processing, and/or purchasing of items, e.g. food and beverages, at a local establishment, such as a sports facility or restaurant, via mobile device 202, for the user's receipt at the local establishment. Alternatively, local server 314 may be configured to facilitate the presenting, receiving, and/or processing of wagers at a local establishment, such as a horse race track.

Even other WLANs shown in FIG. 1 are ad hoc wireless networks, such as ad hoc WLAN 350 which includes one or more other mobile devices 320, 322, and 324. Typically, such ad hoc wireless networks provide no external network connectivity. When mobile device 202 is connected in such an ad hoc wireless network, data may be communicated "directly" between mobile device 202 and other mobile devices 320, 322, and 324, i.e. without the data traversing any fixed wireless network infrastructure. For this purpose, mobile device 202 may be configured to enter into and operate in an "ad hoc mode" of operation. Alternatively, mobile device 202 may be configured to operate in an "AP mode" of operation while the other mobile devices 320, 322, and 324 operate in a more conventional "infrastructure mode" of operation, or vice versa.

As described earlier, mobile device 202 has different types of applications stored therein. These applications may include a messaging application (e.g. a PIM application), a voice telephony application, a Web browsing application, a streaming media application, a local service application, a virtual private network (VPN) connection application, a conference meeting application, and/or a military application, as some examples. According to the present disclosure, mobile device 202 is optimized to search for and communicate with the appropriate WLANs based on which type of application is invoked. For example, mobile device 202 may search for WLANs 104 and 122 in response to the messaging application, the voice telephone application, or the Web browser application being invoked. Alternatively, mobile device 202 may search for WLAN appliances (e.g. WLAN appliance 302) in response to the streaming media player application being invoked. Further, mobile device 202 may search for ad hoc WLAN 350 in response to the conference meeting application or the military application being invoked. Also alternatively, mobile device 202 may search for WLANs providing local services (e.g. WLAN 312) in response to a local service application being invoked.

Figure 6:
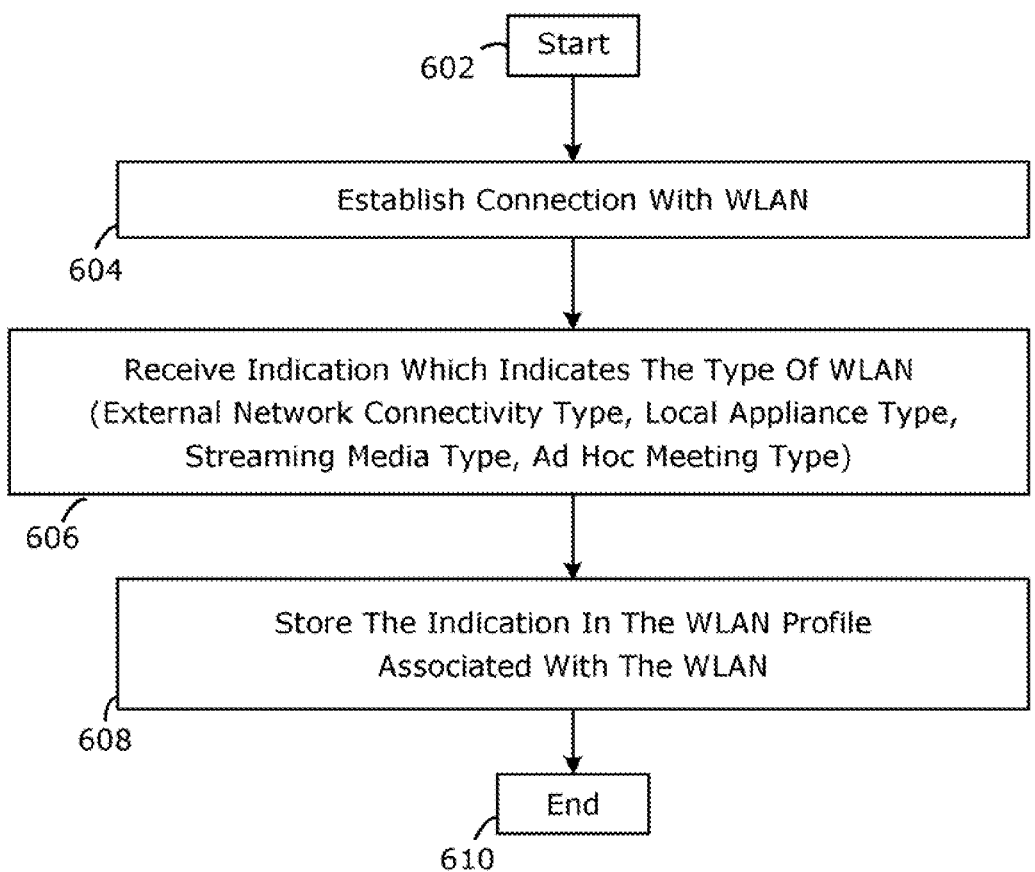
FIG. 6 is a flowchart of a method for use in scanning for wireless networks based on application type.

Referring ahead now to FIG. 6, a flowchart of an exemplary method for use in scanning for wireless networks is shown. More particularly, the method of FIG. 6 relates to identifying and indicating different subsets of WLAN profiles corresponding to different types of WLANs. The method of FIG. 6 may make use of the method of FIG. 7, which is described later below. The method of FIG. 6 may be performed by mobile device 202 described in relation to FIGS. 1-5. In particular, the techniques described in relation to the flowchart may be performed by one or more controllers or processors of the mobile device along with its wireless or RF transceiver. A computer program product which may embody the technique may include a computer readable medium (e.g. memory of the communication device, computer disk, CD-ROM, etc.) having computer instructions stored therein which are executable by the one or more processors of the mobile device for performing the technique.

Note that the mobile device is configured to store a plurality of WLAN profiles in its memory, e.g., as a list of preferred networks. Each WLAN profile has WLAN information contained therein. The WLAN information may include an identification which identifies the WLAN (e.g. a SSID or ESSID), and any authentication information for obtaining access to the wireless network (e.g. a network key, passkey, security key, etc.). The mobile device normally operates to search for WLANs identified in its stored WLAN profiles, and communicate in an available one of these WLANs. Conversely, the mobile device normally refrains from searching for and communicating in WLANs other than those WLANs having stored WLAN profiles.

When the mobile device is powered-on, or RF coverage is regained after a coverage loss, the mobile device performs a scanning operation with use of its wireless transceiver to identify one or more available WLANs in its surrounding area. During each scanning operation, the mobile device may transmit a probe request to each WLAN identified in its WLAN profiles, and wait for a probe response from the network in return. Each time the scanning operation fails to result in any connection between the mobile device and a WLAN, the scanning operation is repeated by the mobile device after delaying for a delay period. This process continually repeats until the mobile device connects with one of the WLANs. As apparent, the lesser the number of WLANs to search for during each scanning cycle, the less power the mobile device consumes.

Beginning at a start block 602 of FIG. 6, the mobile device establishes a connection with and operates in a WLAN (step 604 of FIG. 6). If the WLAN is a newly-encountered WLAN, the mobile device may cause a user input prompt to be displayed in the display, where the user input prompt indicates a request for whether a WLAN profile associated with the WLAN should be saved in memory. In response, the mobile device stores a WLAN profile associated with the WLAN in memory, e.g., in its list of preferred networks.

For such usable WLANs, one or more indications which indicate the predetermined type(s) of WLAN are identified (step 606 of FIG. 6). For example, these indications may be received from the WLAN through the wireless transceiver of the mobile device. The predetermined types may be or include, as examples, an external network connectivity type, an appliance type (which is a local-only type), an appliance type such as a streaming media player type (which is a local-only type), a local service type (which is a local-only type), and an ad hoc type (which is a local-only type). The external network connectivity type may be further indicated as being of the "paid" type (or higher cost type) or "free" type (or lower cost type). The mobile device then stores, in the WLAN profile associated with the WLAN, one or more corresponding indications of the received predetermined type(s) (step 608 of FIG. 6). The flowchart of FIG. 6 ends at an end block 610.

Thus, in the present example, a first subset of the WLAN profiles may correspond to WLANs indicated or designated as traditional WLANs having external network connectivity, a second subset of the WLAN profiles may correspond to WLANs indicated or designated as WLAN appliances, and a third subset of the WLAN profiles may correspond to ad hoc WLANs. These first, second, and third subsets of WLAN profiles may (or may not) be mutually exclusive subsets. Again, these are merely examples, and other WLAN types, indicators and subsets of WLAN profiles may be utilized.

Following the example, the mobile device may maintain in each WLAN profile an "external network connectivity" type indication for WLANs 104 and 122 which have external network connectivity, or a "local-only" type indication for WLAN appliance 302, WLAN 312, and ad hoc WLAN 350, which have no external network connectivity. Further, the mobile device may maintain in each WLAN profile an "appliance" type indication for WLAN appliances, such as WLAN appliance 302, and a "non-appliance" type indication for WLANs 104 and 122, WLAN 312, and ad hoc WLAN 350. Also, the mobile device may maintain in each WLAN profile an "infrastructure" type indication for WLANs 104 and 122, WLAN appliance 302, and WLAN 312, or an "ad hoc" type indication for ad hoc WLAN 350. The mobile device may utilize the described indications to select or sort the WLAN profiles for efficient scanning, as described further below in relation to FIG. 7.

In step 606, the mobile device may receive from the WLAN a message which indicates the predetermined type of WLAN. The indication may be a data indication or a bit indication in the message (e.g. a bit indication of "1" indicating a predetermined type, or a bit indication of "0" as not being the predetermined type). This indication may be an indication in a data field which is reserved for the sole purpose of communicating the predetermined type of WLAN. The indication may further be defined as a new, unique information element (IE) defined in IEEE 802.11 or other relevant standard. The WLAN may regularly or periodically broadcast the one or more indicators that are indicative of the type, which are received by the mobile device. Alternatively, the mobile device may transmit a probe request to the WLAN and, in response, receive a probe response which includes the one or more indicators of the type. In such embodiments, the mobile device need not have to connect with the WLAN as described in relation to step 604 of FIG. 6 in order to receive such indication.

Alternatively, the indication may be an indication in a data field which is utilized for a different purpose but nonetheless determinable of the type (e.g. through examination or inference by the mobile device). For example, the mobile device may determine whether the WLAN is a predetermined type based on the WLAN identification (e.g. SSID or ESSID) associated therewith. In this example, the mobile device may maintain in memory a stored list of WLAN identifications of the predetermined type, and compare the WLAN identification with those in the stored list of WLAN identifications. If there is a match between the WLAN identification and any one of the identifications in the stored list, then the mobile device may deem that the WLAN is of the predetermined type. This stored list of WLAN identifications may be stored in advance of device operation, and/or received via its receiver or wireless receiver. For example, the mobile device may receive the list of WLAN identifications on a regional or country basis based on the current location of the mobile device.

Also alternatively, the mobile device may maintain in memory a stored list of names indicative of the predetermined type (e.g. the name "MEDIA", "PLAYER", or any other indicative name), and compare at least portions of the WLAN identification with the names in the stored list of names. If there is a match between a portion of the WLAN identification and any one of the names in the stored list, then the mobile device may deem that the WLAN is of the predetermined type.

Finally, at least some of the types or characteristics of the WLANs may be alternatively or additionally "inferred" or detected by the mobile device during operation with the WLAN. For example, the mobile device may connect with the WLAN for communications, attempt external network connectivity, and detect the WLAN type based on whether or not external network connectivity is successful. As another example, the mobile device may connect with the WLAN, attempt VPN connectivity with use of the VPN connection application, and detect the WLAN type (e.g. VPN connectivity or no VPN connectivity) based on whether or not VPN connectivity is successful. As a further example, the mobile device may connect with the WLAN, attempt an appliance protocol or connection, and detect the WLAN type based on whether or not the appliance protocol or connection is successful.

Figure 7:
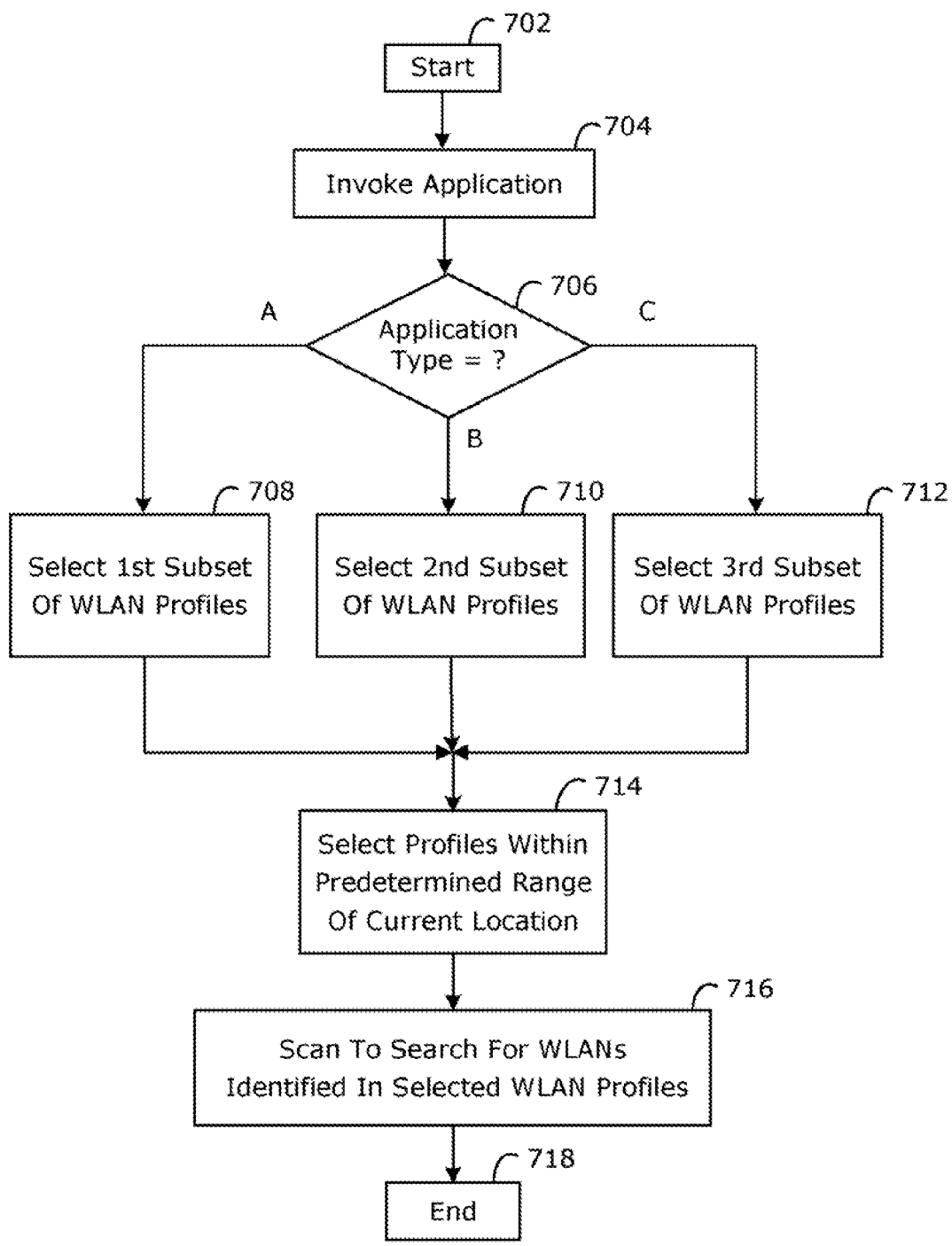
FIG. 7 is a flowchart of a further method for use in scanning for wireless networks based on application type.

FIG. 7 is another flowchart of a method for use in scanning for wireless networks is shown. The method of FIG. 7 may make use of the method of FIG. 6, described above. More particularly, the method of FIG. 7 relates to scanning different subsets of WLAN profiles based on which application in the mobile device is invoked. Similar to FIG. 6, the method of FIG. 7 may be performed by mobile device 202 described in relation to FIGS. 1-5. In particular, the techniques described in relation to the flowchart may be performed by one or more controllers or processors of the mobile device along with its wireless or RF transceiver. A computer program product which may embody the technique may include a computer readable medium (e.g. memory of the communication device, computer disk, CD-ROM, etc.) having computer instructions stored therein which are executable by the one or more processors of the mobile device for performing the technique.

Operation commences in FIG. 7 with the mobile device having no established connections with any WLAN. Beginning at a start block 702 of FIG. 7, the mobile device invokes one of the applications stored in its memory (step 704 of FIG. 7). Here, the mobile device may receive, via its user interface, an input signal from a user to invoke the particular application. On the other hand, the application may be a default application which is invoked by the mobile device upon power-up, and/or when no other application is invoked (e.g. no other application being invoked to override the default application).

If the invoked application is a first type of application, then the mobile selects a first subset of WLAN profiles from those stored in memory (step 708 of FIG. 7). The first subset of WLAN profiles may correspond to traditional WLANs having external network connectivity, and be selected by identifying those WLAN profiles having "external network connectivity" type indications stored therein. On the other hand, if the invoked application is a second type of application, then the mobile selects a second subset of WLAN profiles from those stored in memory (step 710 of FIG. 7). The second subset of WLAN profiles may correspond to WLAN appliances, and be selected by identifying those WLAN profiles having "appliance" type indications stored therein. If the application is a third type of application, then the mobile selects a third subset of WLAN profiles from those stored in memory (step 712 of FIG. 7). The third subset of WLAN profiles may correspond to ad hoc WLANs, and be selected by identifying those WLAN profiles having "ad hoc" type indications stored therein. Again, these WLAN types, indicators, and subsets of WLAN profiles are examples and others may be utilized (e.g. select WLAN profiles indicating external network connectivity and VPN connectivity in response to invoking the VPN connection application; select WLAN profiles indicating local service availability in response to invoking the local service application; etc.).

After steps 708, 710, or 712, the mobile device may further select, from the selected subset of WLAN profiles, only those WLAN profiles corresponding to WLANs within a predetermined range of the current location of the mobile device (step 714 of FIG. 7). The process of step 714 will be described in more detail later below. Then, the mobile device operates to scan to search for those WLANs identified in the selected WLAN profiles (step 716 of FIG. 7). On the other hand, the mobile device refrains from scanning to search for WLANs in other, non-selected WLAN profiles.

During each scanning cycle, the mobile device may send a probe request to each WLAN identified in the selected WLAN profiles, and wait to receive a probe response from the network (if available) in return. This may be done with use of the WLAN identification (e.g. SSID) stored in association with each WLAN profile. Each time the scanning operation fails to result in any connection between the mobile device and a WLAN, the scanning operation is repeated by the mobile device after delaying for a delay period. This process continually repeats until the mobile device connects with one of the WLANs. When connected and operating in the network, the mobile device receives services made available or possible in or via the WLAN. The services may be or include a voice telephony service (e.g. VoIP), a data communication service, an Internet access service, a data synchronization service, an e-mail message delivery service, a streaming media player service, a conference meeting service, a military service, etc. The flowchart ends at an end block 718 of FIG. 7.

As apparent, as the mobile device has a lower number of WLANs to search for in each scanning cycle (i.e. the selected subset of WLAN profiles, in contrast to all WLAN profiles stored in memory), the more quickly and efficiently the mobile device can identify and connect with a suitable WLAN for communications. Further, the mobile device will consume less power as the number of WLANs to search for is lower. For example, if the mobile device has ten (10) WLAN profiles stored therein, five (5) of which are designated as traditional WLANs (i.e. the first subset) and five (5) of which are designated as WLAN appliances (i.e. the second subset), the mobile device only scans to search for half as many WLANs during each scanning cycle.

As described in relation to step 714 of FIG. 7, the mobile device may further select, from the selected subset of WLAN profiles, only those WLAN profiles corresponding to WLANs within a predetermined range of the device's current location. This may be done as follows. Each WLAN profile in the subset of WLAN profiles may include position information corresponding to a geographic position of the WLAN associated therewith. When selecting the WLAN profiles from the subset for scanning (i.e. in step 714 of FIG. 7), the mobile device identifies position information corresponding to a current geographic position of the mobile device. This may done with use of the GPS receiver, where the mobile device may use the GPS receiver to periodically receive its geographic position or location. On the other hand, the mobile device may associate various geographic positions with one or more different cell identifiers of one or more cellular networks being identified.

In the technique, the mobile device compares the position information of the mobile device with the position information in each selected WLAN profile, for identifying whether the mobile device is within a predetermined range of the WLAN. If the mobile device is within the predetermined range of the WLAN, then the mobile device will confirm the selection of the WLAN profile for scanning to search for the WLAN. Otherwise, if the mobile device is outside of the predetermined range of the WLAN, then the mobile device will not select the WLAN profile for scanning, and therefore refrain from scanning to search for the WLAN associated with that WLAN profile.

Thus, techniques for efficient scanning for WLANs based on application type have been described. A mobile communication device invokes a first application or a second application. When the first application is invoked, the mobile device scans to search for one or more WLANs identified in a first subset of WLAN profiles. When the second application is invoked, the mobile device scans to search for one or more WLANs identified in a second subset of WLAN profiles. The first application may be a messaging application, a voice telephony application, or a Web browsing application, which may utilize WLANs having external network connectivity. The second application may be a local appliance application (e.g. a streaming media application) or a local service application which may utilize WLAN appliances or WLANs having no external network connectivity. Alternatively, the second application may be a conference meeting application or proprietary military application which may utilize ad hoc networks having no external network connectivity. Advantageously, a suitable wireless network may be more efficiently identified with use of a technique which reduces power consumption of the mobile device.

The above-described embodiments of the present disclosure are intended to be examples only. Those of skill in the art may affect alterations, modifications and variations to the particular embodiments without departing from the scope of the application. Although the description relates to specific examples for illustration, where the WLAN is an IEEE 802.11-based network, for example, different environments may be applicable as well. As a few other examples, the wireless network may be a Bluetooth-based network, a WiMAX-based network (i.e. IEEE 802.16), or an Ultra-WideBand (UWB)-based network (i.e. IEEE 802.15). The invention described herein in the recited claims intends to cover and embrace all suitable changes in technology.

What is claimed is:

1. A method for use in scanning for wireless local area networks (WLANs) or WLAN devices by a mobile device which has a set of profiles stored therein, the method comprising:
   maintaining, with a controller of the mobile device, an external network connectivity indication in association with each profile of a first subset of profiles, the external network connectivity indication indicating that the WLAN or WLAN device associated with the profile has external network connectivity;
   maintaining, with the controller, a local-only connectivity indication in association with each profile of a second subset of profiles, the local-only connectivity indication indicating that the WLAN or WLAN device associated with the profile has no external network connectivity;
   when a first application in the mobile device is invoked, the controller scanning to search for one or more WLANs or WLAN devices identified in the first subset of profiles; and
   when a second application in the mobile device is invoked, the controller scanning to search for one or more WLANs or WLAN devices identified in the second subset of profiles.

2. The method of claim 1, wherein the one or more WLANs or WLAN devices identified in the second subset of profiles are one or more WLAN appliances.

3. The method of claim 1, further comprising:
   when a third application in the mobile device is invoked, scanning to search for one or more WLANs or WLAN devices identified in a third subset of the profiles.

4. The method of claim 1, further comprising:
   for each one of the WLANs or WLAN devices:
     communicating with the WLAN or WLAN device;
     identifying whether the WLAN or WLAN device has external network connectivity or no external network connectivity; and
     when the WLAN or WLAN device is identified to have external network connectivity, storing the external network connectivity indication in the profile corresponding to the WLAN or WLAN device.

5. The method of claim 1, further comprising:
   for each one of the WLANs or WLAN devices:
     communicating with the WLAN or WLAN device;
     identifying whether the WLAN or WLAN device has external network connectivity or no external network connectivity;
     when the WLAN or WLAN device is identified to have external network connectivity, storing an external network connectivity indication in the profile corresponding to the WLAN or WLAN device; and
     when the WLAN or WLAN device is identified to have no external network connectivity, storing a local-only connectivity indication in the profile corresponding to the WLAN or WLAN device.

6. The method of claim 1, wherein each one of a plurality of the profiles in the first subset includes position information corresponding to a geographic position of the WLAN or WLAN device associated therewith, and wherein the scanning to search for the one or more WLANs or WLAN devices identified in the first subset of profiles further comprises:
   identifying position information corresponding to a geographic position of the mobile device;
   for each profile in the first subset:
     comparing the position information of the mobile device with the position information of the WLAN or WLAN device for identifying whether the mobile device is within range of the WLAN or WLAN device; and
     when the mobile device is identified to be within range of the WLAN or WLAN device, scanning to search for the WLAN or WLAN device; and
     when the mobile device is identified to be outside of range of the WLAN or WLAN device, refraining from scanning to search for the WLAN or WLAN device.

7. The method of claim 1, further comprising:
   wherein the first application comprises a personal information manager application where data synchronization is performed with a remote host server; and
   wherein the second application comprises one of a streaming media application, an ad-hoc meeting application or a military communication application.

8. The method of claim 1, wherein the mobile device is operative for communications with WLANs and WLAN devices in accordance with IEEE 802.11.

9. The method of claim 1, which is performed by computer instructions stored in a non-transitory computer readable medium, the computer instructions being executable on one or more processors of the mobile device.

10. A mobile communication device, comprising:
a controller;
a radio frequency (RF) transceiver coupled to the controller;
the RF transceiver configured to communicate with a wireless local area network (WLAN) or WLAN device;
a memory coupled to the controller;
the memory having a set of profiles stored therein;
the controller being configured to:
 maintain an external network connectivity indication in association with each profile of a first subset of profiles, the external network connectivity indication indicating that the WLAN or WLAN device associated with the profile has external network connectivity;
 maintain a local-only connectivity indication in association with each profile of a second subset of profiles, the local-only connectivity indication indicating that the WLAN or WLAN device associated with the profile has no external network connectivity;
 when a first application in the mobile device is invoked, scan with use of the RF transceiver to search for one or more WLANs or WLAN devices identified in a first subset of profiles stored in the mobile device; and
 when a second application in the mobile device is invoked, scan with use of the RF transceiver to search for one or more WLANs or WLAN devices identified in a second subset of profiles stored in the mobile device.

11. The mobile communication device of claim 10, wherein the one or more WLANs or WLAN devices identified in the second subset of profiles are one or more WLAN appliances.

12. The mobile communication device of claim 10, wherein the controller is further configured to:
 invoke the first application, the second application, or a third application in the mobile communication device;
 when the third application is invoked, scan with use of the RF transceiver to search for one or more WLANs or WLAN devices identified in a third subset of profiles stored in the mobile device.

13. The mobile communication device of claim 10, wherein the controller is further configured to, for each one of the WLANs or WLAN devices:
 communicate with the WLAN with use of the RF transceiver;
 identify whether the WLAN or WLAN device has external network connectivity or no external network connectivity; and
 when the WLAN or WLAN device is identified to have external network connectivity, store the external network connectivity indication in the profile corresponding to the WLAN or WLAN device.

14. The mobile communication device of claim 10, wherein the controller is further configured to, for each one of the WLANs or WLAN devices:
 communicate with the WLAN or WLAN device via the RF transceiver;
 identify whether the WLAN or WLAN device has external network connectivity or no external network connectivity;
 when the WLAN or WLAN device is identified to have external network connectivity, store the external network connectivity indication in the profile corresponding to the WLAN or WLAN device; and
 when the WLAN or WLAN device is identified to have no external network connectivity, store the local-only connectivity indication in the profile corresponding to the WLAN or WLAN device.

15. The mobile communication device of claim 10, wherein each one of a plurality of the profiles in the first subset includes position information corresponding to a geographic position of the WLAN or WLAN device associated therewith, and wherein the controller is further configured to:
 identify position information corresponding to a geographic position of the mobile communication device;
 for each profile in the first subset:
  compare the position information of the mobile device with the position information of the WLAN or WLAN device for identifying whether the mobile device is within range of the WLAN or WLAN device; and
  when the mobile device is identified to be within range of the WLAN or WLAN device, scan to search for the WLAN or WLAN device; and
  when the mobile device is identified to be outside of range of the WLAN or WLAN device, refrain from scanning to search for the WLAN or WLAN device.

16. The mobile communication device of claim 10, further comprising:
 wherein the first application comprises a personal information manager application where data synchronization is performed with a remote host server; and
 wherein the second application comprises a streaming media application.

17. The mobile communication device of claim 10, further comprising:
 wherein the first application comprises a personal information manager application where data synchronization is performed with a remote host server; and
 wherein the second application comprises an ad-hoc meeting application.

18. The mobile communication device of claim 10, which is operative for communications with WLANs and WLAN devices in accordance with IEEE 802.11.

19. A method for use in scanning for wireless local area networks (WLANs) or WLAN devices by a mobile device, the method comprising:
 for each one of a plurality of WLANs or WLAN devices:
  a controller of the mobile device communicating with the WLAN or WLAN device;
  identifying, with the controller, whether the WLAN or WLAN device has external network connectivity or no external network connectivity;
  when the WLAN or WLAN devices is identified to have external network connectivity, storing an external network connectivity indication in a profile corresponding to the WLAN or WLAN device;
  when the WLAN or WLAN device is identified to have no external network connectivity, storing a local-only connectivity indication in the profile corresponding to the WLAN or WLAN device;
 when a first application in the mobile device is invoked, scanning to search for one or more WLANs or WLAN devices identified in a first subset of profiles having the external network connectivity indications; and when a second application in the mobile device is invoked, scanning to search for one or more WLANs or WLAN devices identified in a second subset of profiles having the local-only connectivity indications.

20. The method of claim 19, further comprising:
wherein the first application comprises one of a messaging application, a voice telephony application, or a Web browser application; and
wherein the second application comprises an application for a WLAN appliance.

21. A mobile communication device, comprising:
a controller;
a radio frequency (RF) transceiver coupled to the controller;
the RF transceiver configured to communicate with a wireless local area network (WLAN) or WLAN device;
a memory coupled to the controller;
the memory having a set of profiles stored therein;
the controller being configured to:
for each one of a plurality of WLANs or WLAN devices:
communicate with the WLAN or WLAN device via the RF transceiver;
identify whether the WLAN or WLAN device has external network connectivity or no external network connectivity;
when the WLAN or WLAN device is identified to have external network connectivity, store in the memory an external network connectivity indication in the profile corresponding to the WLAN or WLAN device;
when the WLAN or WLAN device is identified to have no external network connectivity, store in the memory a local-only connectivity indication in the profile corresponding to the WLAN or WLAN device;
when a first application in the mobile device is invoked, scan with use of the RF transceiver to search for one or more WLANs or WLAN devices identified in a first subset of profiles having the external network connectivity indications; and
when a second application in the mobile device is invoked, scan with use of the RF transceiver to search for one or more WLANs or WLAN devices identified in a second subset of profiles having the local-only connectivity indications.

22. The mobile device of claim 21, further comprising:
wherein the first application comprises one of a messaging application, a voice telephony application, or a Web browser application; and
wherein the second application comprises an application for a WLAN appliance.

23. A method for use in scanning for wireless local area networks (WLANs) or WLAN devices by a mobile device, the method comprising:
invoking a first application, a second application, or a third application in the mobile device;
when the first application is invoked, a controller of the mobile device scanning to search for one or more WLANs or WLAN devices identified in a first subset of profiles stored in the mobile device;
when the second application is invoked, the controller scanning to search for one or more WLANs or WLAN devices identified in a second subset of profiles stored in the mobile device; and
when the third application is invoked, the controller scanning to search for one or more WLANs or WLAN devices identified in a third subset of profiles stored in the mobile device.

24. The method of claim 23, further comprising:
wherein the first application comprises one of a messaging application, a voice telephony application, or a Web browser application; and
wherein the second application comprises an application for a wireless network appliance.

25. A mobile communication device, comprising:
a controller;
a radio frequency (RF) transceiver coupled to the controller;
the RF transceiver configured to communicate with a wireless local area network (WLAN) or WLAN devices;
a memory coupled to the controller;
the memory having a set of profiles stored therein;
the controller being configured to:
invoke a first application, a second application, or a third application in the mobile device;
when the first application is invoked, scan with use of the RF transceiver to search for one or more WLANs or WLAN devices identified in a first subset of the stored profiles;
when the second application is invoked, scan with use of the RF transceiver to search for one or more WLANs or WLAN devices identified in a second subset of the stored profiles; and
when the third application is invoked, scan with use of the RF transceiver to search for one or more WLANs or WLAN devices identified in a third subset of the stored profiles.

26. The mobile device of claim 25, further comprising:
wherein the first application comprises one of a messaging application, a voice telephony application, or a Web browser application; and
wherein the second application comprises an application for a WLAN appliance.

27. A method for use in scanning by a mobile device which has a set of wireless network profiles stored therein, the method comprising:
maintaining, with a controller of the mobile device, an external network connectivity indication in association with each wireless network profile of a first subset of wireless network profiles, the external network connectivity indication indicating that a wireless network associated with the wireless network profile has external network connectivity;
maintaining, with the controller, an appliance type indication in association with each wireless network profile of a second subset of wireless network profiles, the appliance type indication indicating that the wireless network associated with the wireless network profile is a type of wireless network appliance;
when a first application of the mobile device is invoked, the controller scanning to search for one or more wireless networks identified in the first subset of wireless network profiles; and
when a second application of the mobile device is invoked, the controller scanning to search for one or more wireless network appliances identified in the second subset of wireless network profiles.

28. The method of claim 27, wherein the mobile device is operative for communications in accordance with IEEE 802.11.

29. The method of claim 27, further comprising:
wherein the first application comprises one of a messaging application, a voice telephony application, or a Web browser application; and
wherein the second application comprises an application for a wireless network appliance.

30. A mobile communication device, comprising:
a controller;
a radio frequency (RF) transceiver coupled to the controller;
the RF transceiver configured to communicate with wireless networks and wireless network appliances;
a memory coupled to the controller;
the memory having a set of wireless network profiles stored therein;
the controller being configured to:
   maintain an external network connectivity indication in association with each wireless network profile of a first subset of wireless network profiles, the external network connectivity indication indicating that the wireless network associated with the wireless network profile has external network connectivity;
   maintain an appliance type indication in association with each wireless network profile of a second subset of wireless network profiles, the appliance type indication indicating that the wireless network associated with the wireless network profile is a type of wireless network appliance;
   when a first application of the mobile device is invoked, scan with use of the RF transceiver to search for one or more wireless networks identified in the first subset of wireless network profiles; and
   when a second application of the mobile device is invoked, scan with use of the RF transceiver to search for one or more wireless network appliances identified in the second subset of wireless network profiles.

31. The mobile device of claim 30, which is operative for communications in accordance with IEEE 802.11.

32. The mobile device of claim 30, further comprising:
wherein the first application comprises one of a messaging application, a voice telephony application, or a Web browser application; and
wherein the second application comprises an application for a type of wireless network appliance.

\* \* \* \* \*